United States Patent
Ejiri

[11] Patent Number: 5,930,451
[45] Date of Patent: Jul. 27, 1999

[54] AUDIO AND VIDEO REPRODUCTION SYSTEM COMPRISING AUDIO REPRODUCTION TIME ADJUSTING UNIT

[75] Inventor: Satoru Ejiri, Tokyo, Japan

[73] Assignee: NEC Corporation, Tokyo, Japan

[21] Appl. No.: 08/808,962

[22] Filed: Feb. 19, 1997

[30] Foreign Application Priority Data

Feb. 19, 1996 [JP] Japan ..................................... 8-030760

[51] Int. Cl.$^6$ ............................... H04N 5/92; H04N 7/12
[52] U.S. Cl. ............................... 386/98; 386/111; 348/423
[58] Field of Search ...................... 386/98, 111; 348/423, 348/515; 704/203, 212, 230; 341/110, 117, 143, 144; 364/715.02; H04N 5/92, 5/76, 7/12, 9/475

[56] References Cited

U.S. PATENT DOCUMENTS 5,467,139  11/1995  Lankford .................................. 348/423
5,565,924  10/1996  Haskell et al. ........................... 348/423
5,657,423   8/1997  Benbassat et al. ....................... 704/230
5,815,634   9/1998  Daum et al. .............................. 386/98

Primary Examiner—Thai Tran
Attorney, Agent, or Firm—Sughrue, Mion, Zinn, Macpeak & Seas, PLLC

[57] ABSTRACT

In an audio and video reproduction system receiving multiplexed data which comprises an audio packet comprising an audio packet header and audio packet data and comprising an audio buffer memory for storing the audio packet data as stored audio data, the audio packet has a plurality of audio rates which correspond to a plurality of rate modes. A detecting block detects a size of the audio packet data as a detected audio data size. A counting block counts the detected audio data size to produce a counted audio data size. A time indication signal generating unit generates a time indication signal by the use of reception system clocks and a time value which is predetermined in relation to the plurality of rate modes. A latching circuit latches the counted audio data size as a latched audio data size on reception of the time indication signal. A CPU decides one of the plurality of audio rates as a decided audio rate to adjust an audio reproduction time of the stored audio data in accordance with the decided audio rate.

5 Claims, 3 Drawing Sheets

AUDIO AND VIDEO REPRODUCTION SYSTEM COMPRISING AUDIO REPRODUCTION TIME ADJUSTING UNIT

BACKGROUND OF THE INVENTION

This invention relates to an audio and video reproduction system having function adjusting an audio reproduction time. The audio and video reproduction system is particularly useful in a multimedia communication system, such as a videophone system, a video conference system, or the like, which uses multiplexed data standardized by an MPEG 2 system standard (ISO/IEC13818-1).

In the multimedia communication system, the audio and video reproduction system receives multiplexed data which comprise video data and audio data incident to the video data. The audio data have a plurality of audio rates which are defined by a plurality of rate modes. The audio and video reproduction system comprises a demultiplexer for demultiplexing the multiplexed data into demultiplexed video data and demultiplexed audio data. The demultiplexed video data are stored into a video buffer memory as stored video data while the demultiplexed audio data are stored into an audio buffer memory as stored audio data. The stored video data are read from the video buffer memory with a video readout rate and are decoded by a video decoder. Similarly, the stored audio data are read from the audio buffer memory with an audio readout rate and are decoded by an audio decoder. The video and the audio decoders are collectively called a decoding block.

In the meantime, the above-mentioned decoding operation must be carried out under a synchronization state of the audio data and the video data. In order to establish the synchronization, it is required to adjust an audio reproduction time, namely, an audio decoding time. Adjustment of the audio reproduction time can be realized by delay adjustment by the use of buffering in the audio buffer memory. In this case, it is required that a mean input rate of the audio buffer memory is equal to a mean output rate of the audio buffer memory. The mean input rate is the rate that the demultiplexed audio data are written into the audio buffer memory. Therefore, the mean input rate is equal to the audio rate. Accordingly, the mean output rate must be equal to the audio rate. This means that the audio rate must be detected before the decoding block in order to adjust the audio reproduction time. However, detection of the audio rate before the decoding block is not yet carried out.

SUMMARY OF THE INVENTION

It is therefore an object of the present invention to provide an audio and video reproduction system which is capable of establishing synchronization of audio data and video data by detecting an audio rate before a decoding block.

An audio and video reproduction system according to the present invention receives multiplexed data which comprises an audio packet comprising an audio packet header and audio packet data and a video packet comprising a video packet header and video data and comprises an audio buffer memory for storing the audio packet data as stored audio data, a video buffer memory for storing the video packet data as stored video data, an audio reproducer for reproducing the stored audio data into reproduced audio data, and a video reproducer for reproducing the stored video data into reproduced video data. The multiplexed data are transmitted in synchronism with transmission system clocks. The audio packet has a plurality of audio rates which correspond to a plurality of rate modes.

According to an aspect of the present invention, the system further comprises detecting means for extracting the audio packet header from the audio packet to detect a size of the audio packet data as a detected audio size, counting means connected to the detecting means for counting the detected audio size to produce a counted audio data size, time indication signal generating means for generating a time indication signal by the use of reception system clocks and a time value which is predetermined in relation to the plurality of rate modes, latching means connected to the counting means and the time indication signal generating means for latching the counted audio data size as a latched audio data size on reception of the time indication signal, and control means supplied with the latched audio data size for deciding one of the plurality of audio rates as a decided audio rate to adjust an audio reproduction time of the stored audio data in accordance with the decided audio rate.

DESCRIPTION OF THE PREFERRED EMBODIMENT

Figure 1:
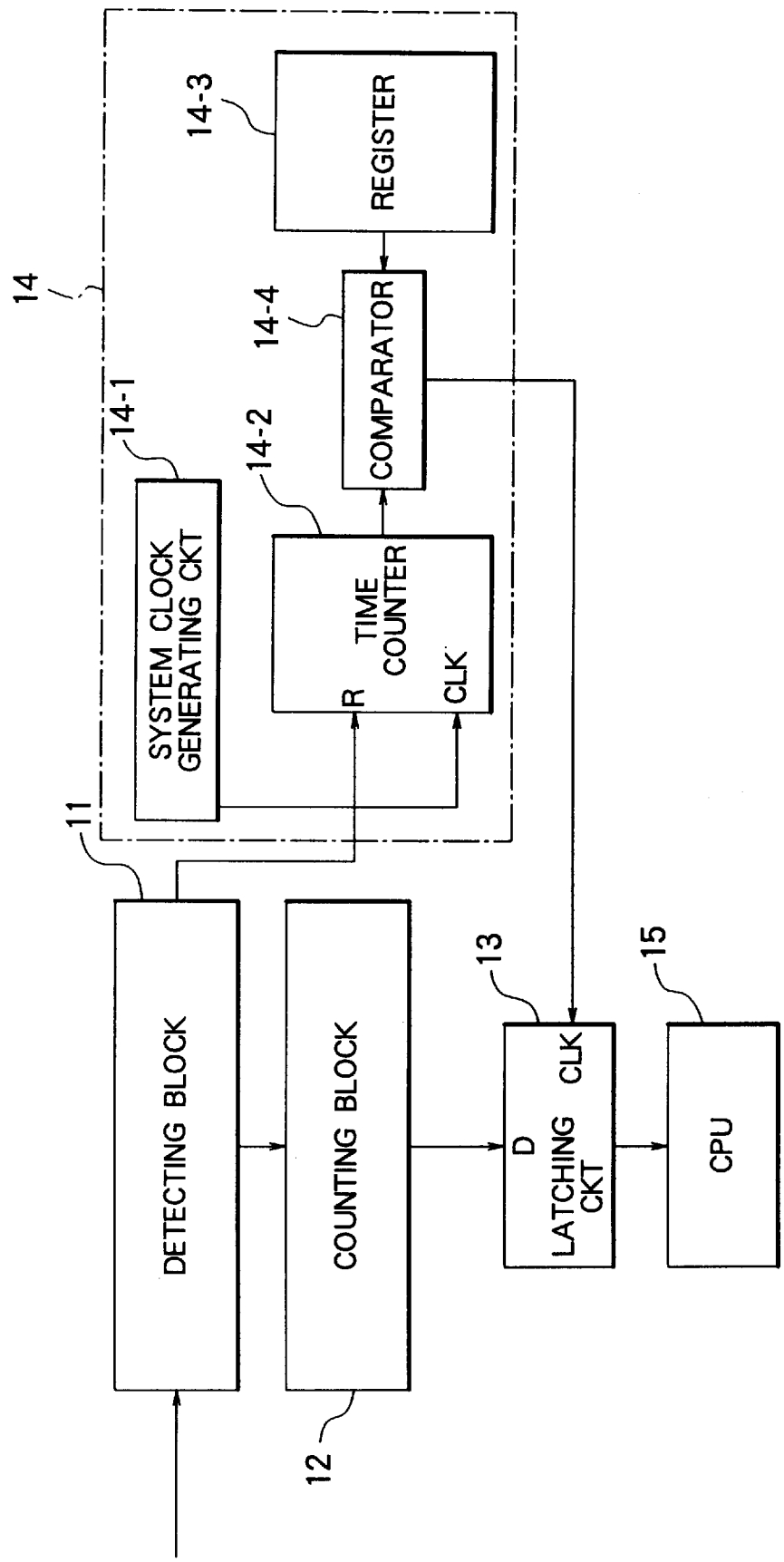
FIG. 1 is a block diagram of an audio rate decision unit which is a part of an audio and video reproduction system according to the present invention.
Figure 2:
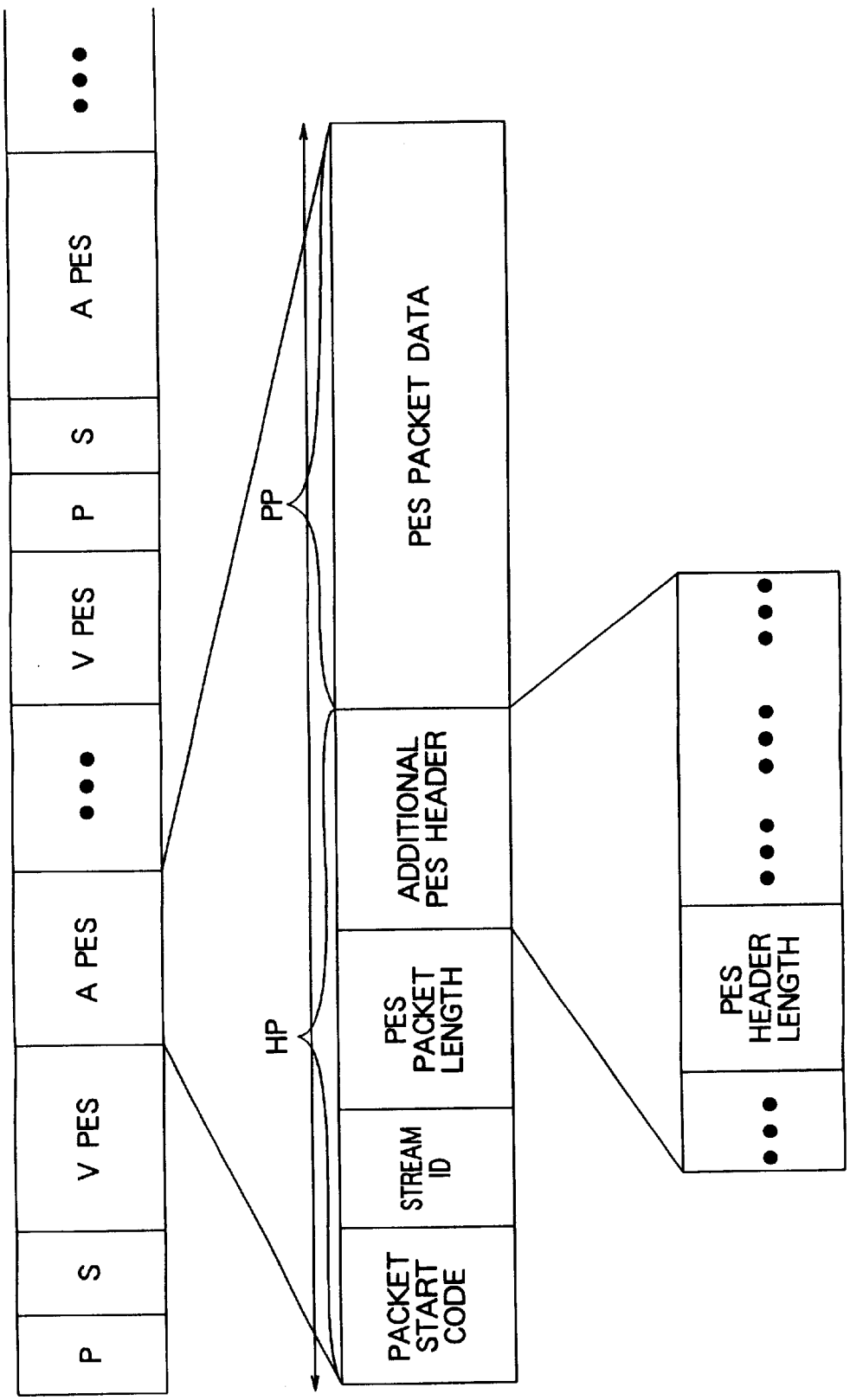
FIG. 2 is an illustration for describing a format of system data which are received by the audio and video reproduction system according to the present invention.

Referring to FIGS. 1 and 2, description will be made with regard to an audio rate decision unit which is a part of an audio and video reproduction system according to a preferred embodiment of the present invention. The audio rate decision unit is arranged before a decoding block which will later be described. The audio rate decision unit receives system data which are synchronized with transmission system clocks and which are multiplexed data comprising audio data and video data. The system data are standardized by an MPEG 2 system standard (ISO/IEC 13818-1). The audio data are transmitted by one of a plurality of audio rates which are correspond to a plurality of rate modes.

In FIG. 2, the system data are constructed in the form of a packet mode and comprise a pack header P, a system header S, a plurality of video PES packets VPES, and a plurality of audio PES packets APES. The audio PES packet APES comprises a header portion HP and a PES packet data portion PP. The header portion HP is used for representing audio header data and comprises a packet start code area, a stream ID area, a PES packet length area, and an additional PES header area. The header portion HP may be called an audio packet header. The additional PES header area comprises a PES header length area. The packet start code area has a packet start code which indicates a start of the audio PES packet APES. The stream ID area has a stream ID for indicating that the PES packet is the audio PES packet. The PES packet length area has information indicating a packet length of the audio PES packet APES. The PES header length area has information indicating a header length of the audio PES packet APES. Although not shown in FIG. 2, the additional PES header area further comprises time stamp information area for recording time stamp information. As well known in the art, the time stamp information are for indicating the audio reproduction time. The PES packet data portion PP comprises audio data. The above construction is applied to the video PES packet VPES. Namely, the video PES packet VPES also comprises a header portion, namely, a video packet header and a PES packet data portion.

Under the circumstances, it is possible to detect a size of the audio data by analyzing the header portion HP only.

In FIG. 1, the audio rate decision unit is for detecting the size of the audio data by analyzing the header portion HP. For this purpose, the audio rate decision unit comprises a detecting block 11, a counting block 12, a latching circuit 13, a time indication signal generating block 14, and CPU (Central Processing Unit) 15. The detecting block 11 extracts, at first, the header portion HP from the system data and detects the packet length of the audio PES packet APES. Thus, the size of the audio data can be detected as a detected audio data size. The detecting block 11 gives the detected audio data size to the counting block 12. The counting block 12 carries out count operation of the detected audio data size and delivers a counted result to the latching circuit 13 as a counted audio data size.

The time indication signal generating block 14 comprises a system clock generating circuit 14-1, a time counter 14-2, a register 14-3, and a comparator 14-4. The system clock generating circuit 14-1 is for generating reception system clocks which are locked, in phase, with the transmission system clocks. The time counter 14-2 is reset by a reset signal produced from the detecting block 11 and starts counting operation of the reception system clocks for producing a time count result. The detecting block 11 produces the reset signal on detection of the audio packet header that is received at first after start of audio rate decision operation which will later be described. The register 14-3 registers a predetermined time value T which will later be described. The comparator 14-3 compares the time count result with the predetermined time value T. The comparator 14-3 produces a detection signal as the time indication signal when the time count result coincides with the predetermined time value T.

The latching circuit 13 latches the counted audio data size as a latched audio data size on reception of the time indication signal. The CPU 15 decides the audio rate as a decided audio rate on the basis of the latched audio data size to adjust an audio reproduction time of an audio buffer memory in accordance with the decided audio rate. As will later be described, the CPU 15 has a plurality of decision regions which are correspond to the plurality of rate modes. The CPU 15 decides whether or not the latched audio data size is included in one of the plurality of decision regions.

Next, the description will proceed to operation of the audio rate decision unit. If the latched audio data size is indicated by S, the predetermined time value T is defined by the following manner by the use of the characteristic of the multiplexed data shown in FIG. 2 in order to decide in correct the audio rate by an equation S/T. According to the MPEG 2 system standard, the audio buffer memory has a limitation in capacity which is not greater than 4096×8 (bits). If the audio rate to be decided is indicated by Xa (bps), a maximum value of an interval of two adjacent audio PES packets is given by 4096×8/Xa because the audio buffer memory is not allowed to under flow. Accordingly, the following limitation is given.

$$T > 4096 \times 8 / Xa. \qquad (1)$$

If the audio data have four kinds of audio rates which are equal to 128 (kbps), 192 (kbps), 256 (kbps), and 384 (kbps), the CPU 15 carries out the decision operation given by the following inequalities (2), (3), (4), (5).

If $S/T<(192-32)(kbps)$, $Xa$ is equal to 128 ($kbps$). (2)

If $(192-32)(kbps) \leq S/T<(256-32)(kbps)$, $Xa$ is equal to 192 ($kbps$). (3)

If $(256-32)(kbps) \leq S/T<(384-64)(kbps)$, $Xa$ is equal to 256 ($kbps$). (4)

If $(384-64)(kbps) \leq S/T$, $Xa$ is equal to 384 (kbps). (5)

In this event, an allowable error range is 32 (kbps). It is therefore required that the CPU 15 carries out the decision operation within the allowable error range of 32 (kbps). Accordingly, the predetermined time value T is given by, $$T > 4096 \times 8 / 32000 - 1.024 \text{ (sec)}. \qquad (6)$$

In conclusion, since the inequality (6) has a most strict restriction, the predetermined time value T is given by T>1.024 (sec) under the condition of Xa>32 (kbps). If the rate modes are given at an interval of 32 (kbps), the register 14-3 may registers the predetermined time value T which satisfies the inequality (6).

Figure 3:
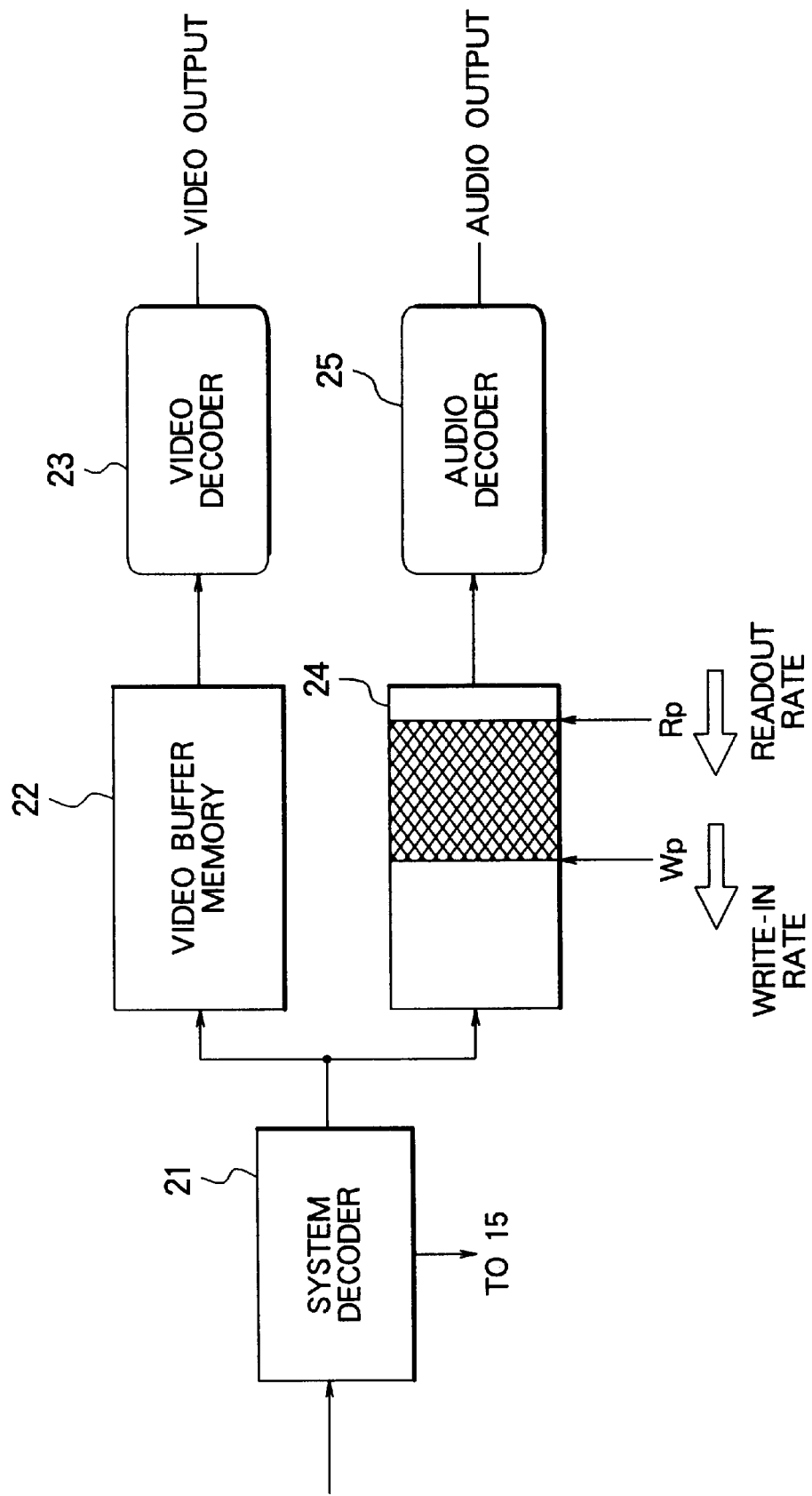
FIG. 3 is a block diagram for describing reproducing operation of the audio and video reproduction system according to the present invention.

Referring to FIG. 3, the description will be made with regard to adjusting operation of the audio reproduction time. The audio and video reproduction system further comprises a system decoder 21, a video buffer memory 22, a video decoder 23, an audio buffer memory 24, and an audio decoder 25. The system decoder 21 receives the system data, namely, the multiplexed data, and demultiplexes the system data into demultiplexed video data and demultiplexed audio data. The system decoder 21 extracts the time stamp information mentioned in conjunction with FIG. 2 from the system data and gives extracted time stamp information to the CPU 15 (FIG. 1).

In the example, each of the video and the audio buffer memories 22 and 24 is implemented by an FIFO (First-in First-out) memory. As well known in the art, the FIFO memory has a write pointer Wp and a read pointer Rp. In this case, a mean input rate of the audio buffer memory 24 is given by a mean shift rate of the write pointer Wp while a mean output rate of the audio buffer memory 24 is given by a mean shift rate of the read pointer Rp.

The video buffer memory 22 stores the demultiplexed video data as stored video data. The stored video data are read from the video buffer memory 22 and are decoded by the video decoder 23. The video decoder 23 produces decoded video data as a video output.

The adjusting operation of the audio reproduction time according to the present invention is carried out by the CPU 15 (FIG. 1) and is characterized by the operation of the audio buffer memory 24. The CPU 15 carries out the adjusting operation by the use of the decided audio rate and the extracted time stamp information extracted by the system decoder 21. For this purpose, the CPU 15 has a time count function for counting the reception system clocks as a time count result. When the demultiplexed audio data included in a specific audio PES packet are stored into the audio buffer memory 24 as stored audio data, the CPU 15 decides whether or not the time stamp information included in the specific audio PES packet is extracted as the extracted time stamp information. When the CPU 15 receives the extracted time stamp information, the CPU 15 sets the read pointer Rp on an address of the audio buffer memory 24 that stores the audio data in the specific audio PES packet. After this, the CPU 15 decides whether or not the time count result coincides with the extracted time stamp information. The CPU 15 never shifts the read pointer Rp until the time count result coincides with the time stamp information. When the time count result coincides with the time stamp information, the CPU 15 shifts the read pointer Rp by the decided audio rate obtained by the audio rate decision unit. As a result, the stored audio data are read from the audio buffer memory 24 as readout audio data. The readout audio data are decoded by the audio decoder 25. Although the audio decoder 25 has a delay in the decoding operation, such a delay is a fixed value. Accordingly, the readout data are decoded at an adjusted audio reproduction time with a fixed delay. Thus, the readout audio data are decoded in synchronization with the video data. Taking the above operation into consideration, the CPU 15 may be called a control unit. The video and the audio decoders 23 and 25 may be called video and audio reproducers, respectively.

As mentioned above, the present invention is based on the following viewpoint. The audio PES packet in the multiplexed data based on the MPEG 2 system (ISO/IEC 13818-1) has a limitation in size of the audio data and in interval of two adjacent audio packet headers. This is because the audio buffer memory has an upper limitation in capacity. Moreover, it is assured that the audio buffer memory can stores the audio data without the overflow and the underflow. Under the circumstances, it is possible to detect the size of the audio data by analyzing the audio packet header. Then, the count operation of the detected audio data size is carried out in accordance with the time value based on the reception system clocks. By the use of the count result, the audio rate is decided. It is possible to adjust the audio reproduction time by using the decided audio rate.

What is claimed is:

1. An audio and video reproduction system receiving multiplexed data which comprises an audio packet comprising an audio packet header and audio packet data and a video packet comprising a video packet header and video data and comprising an audio buffer memory for storing said audio packet data as stored audio data, a video buffer memory for storing said video packet data as stored video data, an audio reproducer for reproducing said stored audio data into reproduced audio data, and a video reproducer for reproducing said stored video data into reproduced video data, said multiplexed data being transmitted in synchronizm with transmission system clocks, said audio packet having a plurality of audio rates which correspond to a plurality of rate modes, said system further comprising:

detecting means for extracting said audio packet header from said audio packet to detect a size of said audio packet data as a detected audio data size;

counting means connected to said detecting means for counting said detected audio data size to produce a counted audio data size;

time indication signal generating means for generating a time indication signal by the use of reception system clocks and a time value which is predetermined in relation to said plurality of rate modes;

latching means connected to said counting means and said time indication signal generating means for latching said counted audio data size as a latched audio data size on reception of said time indication signal; and control means supplied with said latched audio data size for deciding one of said plurality of audio rates as a decided audio rate to adjust an audio reproduction time of said stored audio data in accordance with said decided audio rate.

2. An audio and video reproduction system as claimed in claim 1, wherein said time indication signal generating means comprises;

system clock generating means for generating said reception system clocks which are locked, in phase, with said transmission system clocks;

time counting means for counting said reception system clocks to produce a time count reult;

register means for registering said time value; and comparing means for comparing said time count result with said time value to produce a detection signal as said time indication signal when said time count result coincides with said time value.

3. An audio and video reproduction system as claimed in claim 1, wherein said multiplexed data are standardized by an MPEG 2 system (ISO/IEC 13818-1).

4. An audio and video reproduction system as claimed in claim 1, wherein said control means has a plurality of decision regions which correspond to said plurality of rate modes and decides whether or not said latched audio data size is included in one of the plurality of decision regions.

5. An audio and video reproduction system as claimed in claim 1, wherein said audio buffer memory is implemented by an FIFO memory.

\* \* \* \* \*